(No Model.) 2 Sheets—Sheet 1.
L. J. HIRT.
RADIAL CAR TRUCK.
No. 511,615. Patented Dec. 26, 1893.
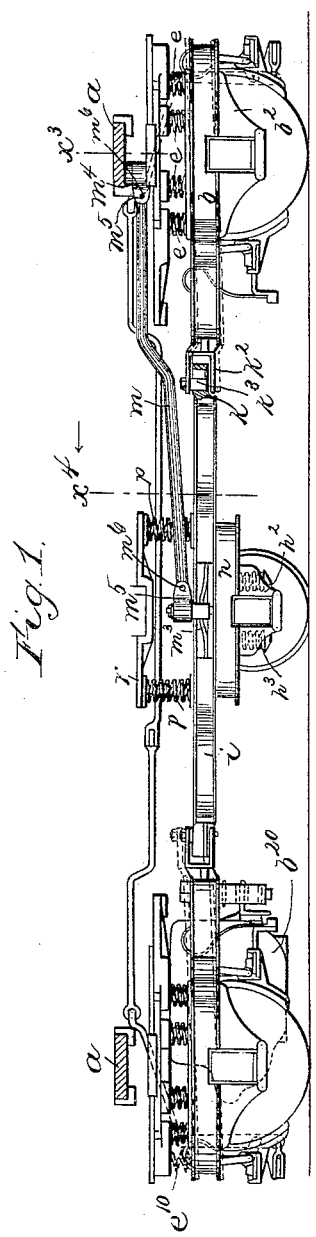
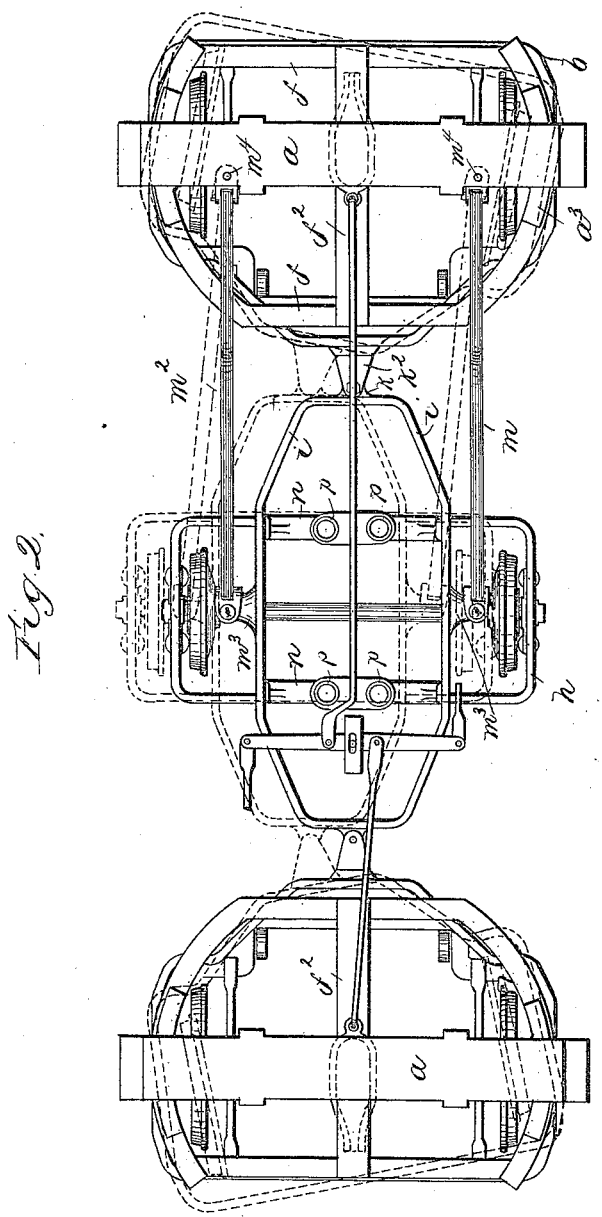
Witnesses,
Jas. J. Maloney
M. E. Hill
Inventor,
Louis J. Hirt.
By Jos. P. Livermore
Atty.

(No Model.) 2 Sheets—Sheet 2.
L. J. HIRT.
RADIAL CAR TRUCK.
No. 511,615. Patented Dec. 26, 1893.
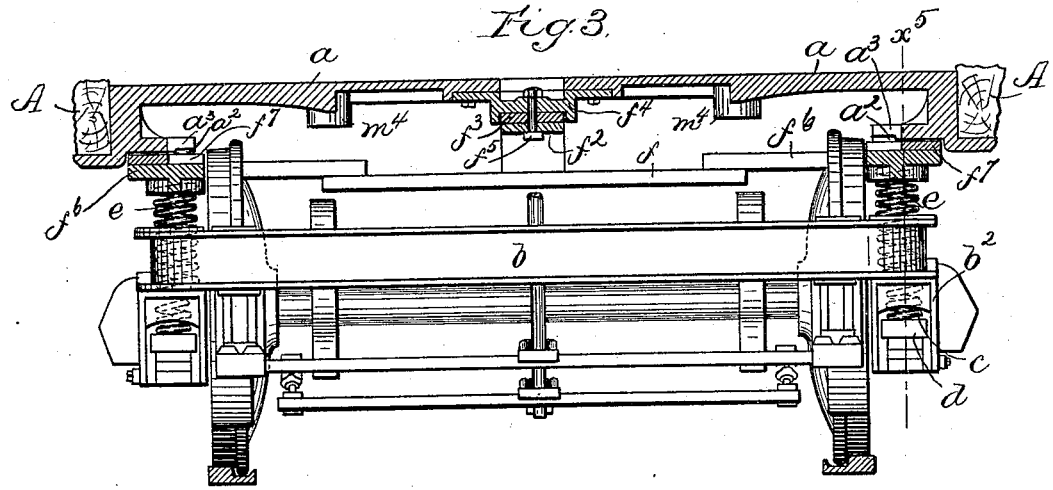
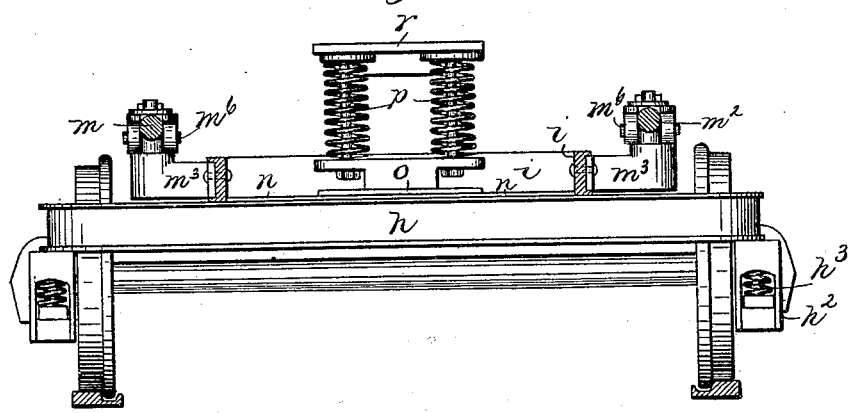
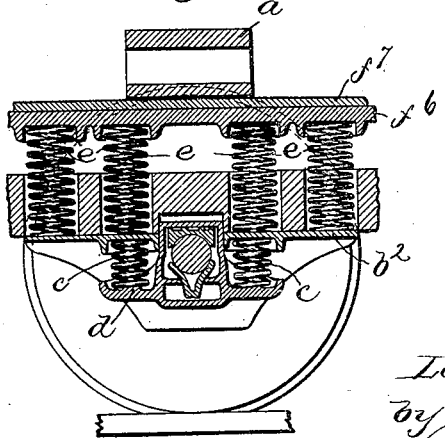
Witnesses
Jas. J. Maloney.
M. E. Hill.
Inventor
Louis J. Hirt,
by Jno. P. Livermore
Atty.

UNITED STATES PATENT OFFICE.

LOUIS J. HIRT, OF BOSTON, MASSACHUSETTS.

RADIAL CAR-TRUCK.

SPECIFICATION forming part of Letters Patent No. 511,615, dated December 26, 1893.

Application filed January 9, 1893. Serial No. 457,776. (No model.)

*To all whom it may concern:*

Be it known that I, LOUIS J. HIRT, of Boston, county of Suffolk, State of Massachusetts, have invented an Improvement in Radial Car-Trucks, of which the following description, in connection with the accompanying drawings, is a specification, like letters on the drawings representing like parts.

My invention relates to a radial car truck of that kind in which two truck frames, one near each end of the car and each resting upon the journals of one pair of wheels, are connected with an intermediate truck frame in such manner that when the said intermediate truck is moved transversely to the car body to a position out of line between the end trucks it causes the end trucks to turn or swivel with relation to the car body so as to bring their axles to a substantially radial position with relation to the curve of the track that caused the intermediate truck to deviate from its position in line with the end trucks.

Trucks having the characteristics of construction and operation just mentioned are old and well known and the present invention consists mainly in details of construction whereby the trucks are rendered more efficient and durable in operation than those heretofore commonly used. The pairs of wheels in the end truck frames are of larger diameter than those in the middle truck frame and sustain substantially the whole weight of the car, the function of the middle truck being almost entirely to govern the swiveling action of the end trucks and the said middle truck sustaining only a very inconsiderable portion of the weight of the car. This materially increases the traction between the wheels of the end trucks and the track, and is consequently of great advantage when the car is propelled by motors that drive the wheels in the end trucks. The middle truck is guided in its transverse movement by a pair of radius bars or links so that instead of moving in a straight line transverse to the car body as in the trucks heretofore constructed it moves in a curved path but is retained with the axis of the wheels parallel in the different positions assumed by the wheels in their curvilinear movement. This construction affords great freedom in the movement of the middle truck and is a great improvement over the construction in which the middle truck travels in a fixed transverse guideway as heretofore practiced, in trucks of this class.

Figure 1 is a side elevation of a car truck embodying this invention, including the beams on which the car body directly rests; Fig. 2 a plan view thereof; Fig. 3 a transverse vertical section on line $x^3$, Fig. 1 showing the end truck frame in end elevation; Fig. 4 a transverse vertical section on line $x^4$, Fig. 1, showing the main portion of the middle truck in end elevation, and Fig. 5 a longitudinal sectional detail, on line $x^5$, Fig. 3.

The car body has fastened to it near each end a transverse beam $a$ constructed to receive and support the longitudinal sills A of the car body, as best shown in Fig. 3. The said beam $a$ is supported upon the end truck through the intervention of bearing plates and springs that will be described and is constructed to provide for the swiveling movement of the said end truck frames with relation to the car body required in the running of the car over curves in the track. The two end trucks are similar in construction so that one only need be described, and each comprises a horizontal open frame $b$ which is provided with pedestals $b^2$ which as best shown in Figs. 3 and 5, rest on the springs $c$ that are supported upon the axle box $d$ which may be of usual construction and rests on the brasses on the wheel journal in the usual manner. Thus the truck frame $b$ with its pedestals has a somewhat yielding support on the wheel journals but not sufficient to properly cushion or relieve the car body from shocks.

The main spring support or yielding cushion for the car body is composed of a number of springs $e$ which rest upon the truck frames over the pedestals thereof, and upon which is supported the swivel bearing frame $f$ which is a horizontal open frame having a longitudinal bridge or cross piece $f^2$ which sustains at its middle a swivel block $f^3$, see Fig. 3, fitting in a recess in a swivel bearing $f^4$ fastened to the middle portion of the cross beam $a$. The portion $f^2$ of the frame is secured to the beam $a$ at the swivel joint by a central bolt $f^5$ which merely adds security to the swiveling connection which is really formed between the block $f^3$ (which is circular) and the socket piece $f^4$, these parts corresponding to the king pin in an ordinary truck, but not in the present case sustaining any appreciable portion of the weight of the car.

The weight of the car is sustained on the curved bearing portions $f^6$ which rest immediately upon the springs $e$ and which are provided with slide plates $f^7$ preferably of steel, upon which rest bearing plates $a^2$ set in the under portion of lateral projections $a^3$ on the beams $a$. The said bearing plates and arms $a^3$ are concentric with the swivel joint $f^3, f^4$, between the truck and beam and constitute the main bearing upon which the swiveling movement takes place, the function of the swivel joint $f^3, f^4$, being rather to determine the axis of the swiveling movement than itself to constitute the swivel bearing between the supporting and supported parts. The truck proper, therefore, consists essentially in two frames $b$, and $f$, and interposed springs $e$ that permit considerable freedom of movement of one frame relative to the other, and especially a complete freedom of vertical movement to allow the springs to act effectively to protect the car body which rests directly upon the upper frame $f$ from the jars or shocks communicated from the wheels to the lower frame $b$ which is itself supported more directly on wheel journals although somewhat cushioned with relation thereto by the springs $c$. This construction also gives a certain flexibility or freedom of rocking movement fore and aft of the lower truck frame $b$ on the journals as indicated by the dotted lines Fig. 1, such movement being restrained only by the set of springs $e$ which are located at both sides of the vertical plane through the wheel axle. This is of importance when the cars are driven by motors mounted in the usual way by a sleeve bearing on the wheel axles and by having their outer ends sustained upon the truck frame $b$ as shown at $b^{20}$ at the left hand of Fig. 1. When the power is applied to rotate the wheels the reaction tends to revolve the motor around the wheel-axle and this reaction is resisted by the support of the outer end of the motor at $b^{20}$ which being transmitted to the frame $b$ tends to revolve the said frame around the wheel axle in the opposite direction to that in which the wheels are being caused to turn. Such tendency to revolution of the frame $b$ results in a rocking thereof in one or the other direction as indicated by the dotted lines in the left hand of Fig. 1, and is gradually resisted by the springs $e$ at one or the other side of the axle so that the effect of said springs is to overcome the momentum of the car gradually in starting, thus greatly increasing the efficiency of the motors. A similar effect is produced when the brakes are applied in stopping the car, the said brakes being supported from the frames $b$ so that when applied to the wheels the friction between the wheels and the brake-shoes tends to turn the frame $b$ in the same direction that the wheels are turning, which tendency is resisted by the springs $e$ and thus checks the advance of the car more gradually and smoothly than would be the case if such spring action did not intervene.

When motors are supported from the frame $b$ as has been described, the weight of said motor will hang from the frame at one side of the wheel axles and would tend to depress that end of the frame $b$. Such weight of the motors may be counterbalanced by making the springs $e$ on the farther side of the wheel axles somewhat heavier than those on the same side as the motor or by using an additional motor-counterbalancing spring as indicated in dotted line at $e^{10}$, at the left hand in Fig. 1, or by setting the springs $e$ on the side of the axle away from the motor at a somewhat greater distance from the vertical plane through the axle than the springs $e$ on the same side with the motor.

The end trucks are turned about their swiveling axes when passing over curves in the track by their engagement with the laterally movable middle truck comprising a horizontal open frame $h$ provided with pedestals $h^2$ supported on boxes on the wheel journals through the intervention of springs $h^3$ this construction being substantially like that of the frames $b$ of the end trucks already described. Upon the frame $h$ is fixed a second frame $i$ which is also a horizontal open frame having its longer dimension lengthwise of the car and being provided at its ends with slotted projections $k$ which extend between forked projections $k^2$ on the portion $b$ of the end truck frames, the said projections $k^2$ being provided with bolts $k^3$ which extend through the longitudinal slots in the projections $k$ so that when the middle truck wheels move laterally from the position in line with the end truck wheels as indicated by the dotted lines in Fig. 2, they will carry the projections $k^2$ of the end truck frames in a lateral direction with relation to the car which will result in a turning of the end trucks about their swivel axes as indicated in dotted lines in Fig. 2, thus retaining the wheel axles at right angles to the length of the track or in other words radial to the curvature of the track by which the middle wheels were thrown from the position in line between the end wheels.

It is necessary that the axle of the middle truck should remain always in its position substantially at right angles to the length of the car in its lateral movement in order that the middle wheels should themselves remain in radial position to the curve of the track, and also in order that the two end trucks should be caused to turn equally, and in order to accomplish this result in radial trucks as heretofore constructed the middle truck has traveled in fixed rectilinear guides transverse to the car body. In this construction there is considerable resistance developed at the guides requiring in many cases that anti-friction devices of some kind should be interposed between the bearing surfaces and thus resulting in a considerable complication of construction and liability to wear and breakage, so that the maintenance of this kind of truck, as heretofore made, in a condition of good repair, has been very costly. These difficulties are overcome in the truck forming the subject of this invention by guiding the middle truck in its transverse movements by means of radius bars or links $m$, $m^2$, of sufficient length to make the arc of movement of the middle truck of small curvature, the said links being each pivoted at one end to a bracket $m^3$ projecting from the portion $i$ of the middle truck frame, and being pivoted at their other ends to projections $m^4$ from one of the beams $a$. Both ends of the radius bars are connected to the vertical pivot studs on the brackets $m^3$ and cross beam $a$, respectively, through the intervention of straps or joints pieces $m^5$ to which the said radius bars are connected by horizontal pivots $m^6$ thus preventing binding in case the middle truck should be horizontally out of level of line with the body of the car which determines the position of the cross beam $a$.

The wheels of the middle truck are of smaller diameter than the wheels of the end trucks, as shown, so as to facilitate their transverse movement under the car without necessitating recessing the car body, and the middle truck is not intended to sustain any substantial portion of the weight of the car but merely to insure the proper swiveling or guiding of the end trucks. In order, however, that some portion of the weight of the car body may be brought upon the middle truck to insure a firm engagement of the wheels of the middle truck with the track, or to diminish their liability to leave the track, the said middle truck is provided with transverse bearing plates $n$ see Figs. 2 and 4, upon which rests a bearing plate $o$ on a block that supports springs $p$ the upper ends of which rest against a bearing plate $r$ fastened to the frame work of the car body.

The springs $p$ are comparatively light and are normally under only slight compression and thus, as before stated, sustain only a small portion of the weight of the car, but any tendency of the middle truck to rise from the track is resisted by said springs backed up by the weight of the car body, and furthermore, when the car is heavily loaded so that the sustaining springs $e$ over the end trucks are considerably compressed, the springs $p$ of the middle truck also become compressed and thus cause the middle truck to sustain a portion of the unusual load. The springs $p$ are distributed at each side of the vertical plane of the wheel axle of the middle truck, and thus permit the longitudinal rocking or oscillation of the said truck in the same manner as has been described with relation to the frames $b$ of the end trucks, while affording a spring resistance to said oscillation.

The entire construction of the truck herein described is such as to afford great flexibility, in all parts, while great strength and durability are insured. The only parts that are subjected to wear to any extent are the bearing plates $f^7$ and $a^2$ over the end trucks, the bearing plates $n$ and $o$ over the middle truck, and the joints at $k$, $k^2$, between the trucks, all of which parts are easily renewable when worn.

I claim—

1. The combination of the truck frame $b$ supported on the wheel journals with the swiveling bearing frame $f$, and the springs $e$ interposed between the said frames $f$ and $b$ near the wheel journals, and at both sides of the vertical plane through the axis thereof, and the cross beam $a$, having a swivel connection with said swivel frame $f$ and concentric bearing plates supported on bearing plates concentric with the swivel axis on said frame $f$, over said springs $e$ substantially as and for the purpose described.

2. The combination of the swiveling end trucks and connected middle truck of a radial car truck with radius bars each pivotally connected at one end with said middle truck and pivotally connected at its other end with a portion of the frame fixed relative to the car body, substantially as and for the purpose described.

3. The combination with the swiveling end trucks, of the connected transversely movable middle truck of a radial car truck, and radius bars each pivotally connected at one end with said middle truck and at its other end with a portion of the frame fixed relative to the car body, the wheels of said middle truck being of smaller diameter than those of the end trucks and said middle truck being provided with transverse bearing plates and springs $p$ interposed between the car body and said bearing plates, substantially as and for the purpose described.

4. The combination of the swiveling end trucks and connected middle truck with radius bars and joint pieces connected with the ends thereof by substantially horizontal pivots, said joint pieces at one end of the radius bars being connected by substantially vertical pivots with the middle truck and at the other ends of the bars by substantially vertical pivots, with a portion of the frame fixed relative to the car body, substantially as and for the purpose described.

In testimony whereof I have signed my name to this specification in the presence of two subscribing witnesses.

LOUIS J. HIRT.

Witnesses:
 JOS. P. LIVERMORE.
 JAS. J. MALONEY.